United States Patent
Roth

(10) Patent No.: US 9,290,095 B2
(45) Date of Patent: Mar. 22, 2016

(54) IGNITION INTERLOCK IDENTIFICATION APPARATUS AND METHOD OF USE THEREOF

(71) Applicant: Michael D. Roth, Scottsdale, AZ (US)

(72) Inventor: Michael D. Roth, Scottsdale, AZ (US)

( * ) Notice: Subject to any disclaimer, the term of this patent is extended or adjusted under 35 U.S.C. 154(b) by 0 days.

(21) Appl. No.: 14/248,955

(22) Filed: Apr. 9, 2014

(65) Prior Publication Data

US 2015/0291029 A1 Oct. 15, 2015

Related U.S. Application Data

(63) Continuation-in-part of application No. 13/295,907, filed on Nov. 14, 2011, now Pat. No. 8,760,299, which is a continuation-in-part of application No. 12/390,995, filed on Feb. 23, 2009, now Pat. No. 8,059,003, application No. 14/248,955, which is a continuation-in-part of application No. 13/942,403, filed on Jul. 15, 2013.

(60) Provisional application No. 61/672,229, filed on Jul. 16, 2012, provisional application No. 61/746,439, filed on Dec. 27, 2012.

(51) Int. Cl.
*G08G 1/14* (2006.01)
*B60K 28/06* (2006.01)

(52) U.S. Cl.
CPC .................................. *B60K 28/063* (2013.01)

(58) Field of Classification Search
CPC ............... G08B 21/22; G08B 21/0286; G08B 21/0211; G08B 21/0261; G08B 21/0269; G08B 21/0272; G08B 21/0288; G08B 21/0423; G08B 21/0492; G08B 21/18; G08B 25/006; G08B 25/008; G08B 21/0205; G07C 9/00111

USPC ......... 340/932.2, 576, 426.11, 539.12, 572.1, 340/573.1, 540, 10.1, 10.3, 10.34, 10.4, 340/10.42

See application file for complete search history.

(56) References Cited

U.S. PATENT DOCUMENTS

| | | | |
|---|---|---|---|
| 4,952,928 A | 8/1990 | Carroll et al. | |
| 5,266,944 A | 11/1993 | Carroll et al. | |
| 6,054,928 A | 4/2000 | Lemelson et al. | |
| 6,323,566 B1 * | 11/2001 | Meier | 307/10.2 |
| 6,748,792 B1 | 6/2004 | Freund et al. | |
| 6,952,161 B1 | 10/2005 | Williams | |

(Continued)

OTHER PUBLICATIONS

Federal Rules of Evidence 902(7), 2015, available at http://federalevidence.com/downloads/rules.of.evidence.pdf, accessed Apr. 28-29, 2015.

*Primary Examiner* — Daniel Previl
(74) *Attorney, Agent, or Firm* — Kevin Hazen

(57) ABSTRACT

The invention comprises a personal identification device used in function of a peripheral device and/or for communication with an external network. In one embodiment, a non-removable personal identification device communicates presence of a specific individual to a peripheral device, such as an ignition interlock device, a tracking system, and/or a communication system or person, such as a police network, an enforcement agency, a regulatory network, a supervisor, and/or a parent or guardian. For example, information related to the peripheral device reliant in part on the presence of the personal identification device is communicated with the remote system. Optionally, any information associated with the personal identification device and/or the peripheral device is maintained in a secure format warranting true information, usable in a legal setting.

20 Claims, 6 Drawing Sheets

(56) References Cited

U.S. PATENT DOCUMENTS

| | | |
|---|---|---|
| 7,003,792 B1 | 2/2006 | Yuen |
| 7,249,182 B1 | 7/2007 | Heinonen et al. |
| 7,522,060 B1 | 4/2009 | Tumperi et al. |
| 7,616,110 B2 | 11/2009 | Crump et al. |
| 8,055,509 B1 | 11/2011 | Walker et al. |
| 8,059,003 B2 * | 11/2011 | Roth ............................ 340/576 |
| 8,095,193 B2 | 1/2012 | Ridder et al. |
| 8,280,436 B2 | 10/2012 | Harris |
| 2002/0070865 A1 | 6/2002 | Lancos et al. |
| 2003/0023638 A1 | 1/2003 | Weight |
| 2003/0095046 A1 | 5/2003 | Borugian |
| 2004/0064415 A1 | 4/2004 | Abdallah et al. |
| 2004/0094622 A1 * | 5/2004 | Vismara ........................ 235/384 |
| 2005/0040944 A1 | 2/2005 | Contestabile |
| 2006/0202842 A1 | 9/2006 | Sofer |
| 2006/0232429 A1 | 10/2006 | Gonzalez |
| 2007/0023496 A1 | 2/2007 | Hall |
| 2007/0028162 A1 | 2/2007 | Griffin et al. |
| 2007/0163308 A1 | 7/2007 | Piane |
| 2007/0239992 A1 | 10/2007 | White et al. |
| 2007/0273537 A1 | 11/2007 | Crespo et al. |
| 2008/0184272 A1 | 7/2008 | Brownewell |
| 2008/0218335 A1 | 9/2008 | Attar |
| 2008/0291011 A1 | 11/2008 | Knight |
| 2009/0146813 A1 * | 6/2009 | Nuno ........................ 340/572.1 |
| 2011/0309932 A1 | 12/2011 | Arringdale et al. |
| 2012/0005224 A1 | 1/2012 | Ahrens et al. |
| 2012/0115506 A1 * | 5/2012 | Bentley ...................... 455/456.1 |
| 2012/0221189 A1 * | 8/2012 | Konet et al. ................... 701/29.1 |
| 2012/0268259 A1 * | 10/2012 | Igel et al. ................. 340/426.11 |
| 2013/0021153 A1 * | 1/2013 | Keays ...................... 340/539.12 |
| 2013/0031074 A1 | 1/2013 | Vartanian et al. |
| 2013/0346545 A1 | 12/2013 | Petersen et al. |

* cited by examiner

IGNITION INTERLOCK IDENTIFICATION APPARATUS AND METHOD OF USE THEREOF

CROSS REFERENCES TO RELATED APPLICATIONS

This application:
is a continuation-in-part of U.S. patent application Ser. No. 13/295,907 filed Nov. 14, 1014, which is a continuation-in-part of U.S. patent application Ser. No. 12/390,995 filed Feb. 23, 2009, now U.S. Pat. No. 8,059,003; and
is a continuation-in-part of U.S. patent application Ser. No. 13/942,403 filed Jul. 15, 2013, which claims the benefit of:
U.S. provisional patent application No. 61/672,229 filed Jul. 16, 2012; and
U.S. provisional patent application No. 61/746,439 filed Dec. 27, 2012,
all of which are incorporated herein in their entirety by this reference thereto.

TECHNICAL FIELD OF THE INVENTION

The present invention relates to an ignition interlock device.

DESCRIPTION OF THE RELATED ART

An ignition interlock device is a mechanism, like a breathalyzer, installed on a motor vehicle's used to: (1) measure a drug concentration of the motor vehicle operator and (2) to use the measured drug concentration and a look-up table in a process of allowing ignition of the vehicle or in prohibiting start-up of the vehicle.
Problem Statement
What is needed is an ignition interlock device coupled to a personal identification device that is unobtrusive.

SUMMARY OF THE INVENTION

The invention comprises a personal identification device used in function of a peripheral device and/or for communication with an external network.

BRIEF DESCRIPTION OF THE DRAWINGS

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE PREFERRED EMBODIMENTS

The invention comprises a personal identification device used to communicate information to/from a peripheral device and/or for communication with an external network, where the communication is optionally encrypted and/or secure.

In one embodiment, a personal identification device communicates with a peripheral device, such as directly and/or through a communication device. For example, a personal identification device is coupled with an ignition interlock device. For example, a wearable personal identification device communicates with an interlock system either via direct communication with a vehicle processor or via an external accessory, such as via use of any of: a cell phone, a tablet computer, a computer network, and/or a personal computer.

In another embodiment, the personal identification device is paired with a system of recording and communicating secure transactional stamps for use in a producing a secure report admissible under the Federal Rules of Evidence.

In yet another embodiment, a series of devices record/transmit true and accurate data in a secure manner usable with an established system, such as a legal system or a medical system.

In still yet another embodiment, the personal identification device communicates biomedical information from the bracelet and/or biomedical information from a peripheral device reliant in part on the presence of the personal identification device to a remote system in a quality assured and/or quality controlled manner.

In yet still another embodiment, the peripheral device communicates with an external computer system or person, such as a police network, a regulatory network, a medical network, a supervisor, and/or a parent or guardian. For example, information related to the peripheral device, reliant in part on the presence of the personal identification device, is communicated with the remote system.

Identification Device/Peripheral Device Communication

Figure 1:
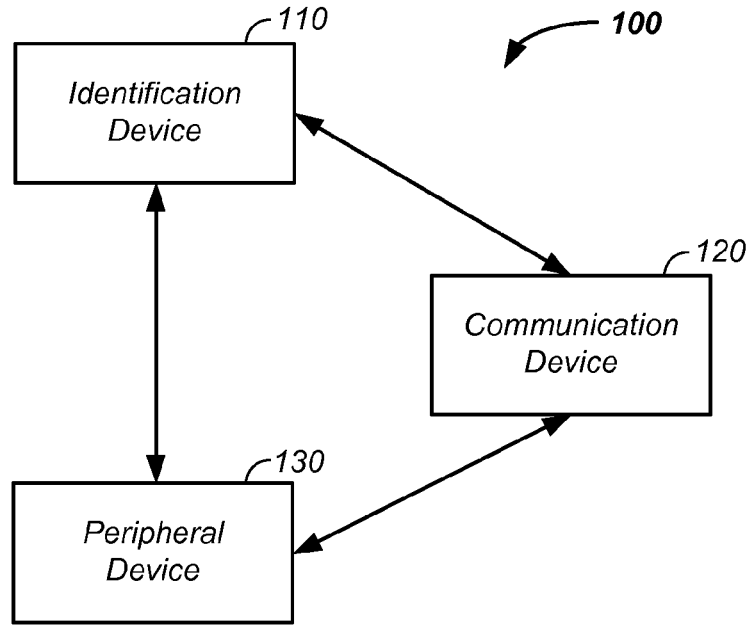
FIG. 1 illustrates relationships between an identification device, a communication device, and a peripheral device.

Referring now to FIG. 1, a personal identification/peripheral device system 100 is illustrated. The personal identification/peripheral device system 100 includes a personal identification device 110 at least intermittently in communication with a peripheral device 130. In a first case, the identification device 110 directly communicates with the peripheral device 130. In one example, the identification device 110 uses integrated communication hardware and/or an integrated power source. In another example, the power source for the identification device is remotely located. In a second case, the communication between the personal identification device 110 and the peripheral device 130 is indirect, such as through use of any of: a smartphone, a tablet, a personal computer, a wireless network, a network, and/or an external to the bracelet communication system. Examples of peripheral devices include, but are not limited to: a car, a vehicle, a phone, a computer, an electronic lock, a door lock, and an electronic device.

Bracelet/Vehicle Interlock

Herein, without limitation and for clarity of presentation, a bracelet is used as an example of a personal identification device and a vehicle is used as an example of a peripheral device. The bracelet identifies an individual 312 to a vehicle ignition system 500 and is used to verify the individual in records, in chain of custody records, and/or as part of a process of starting the vehicle.

Figure 2:
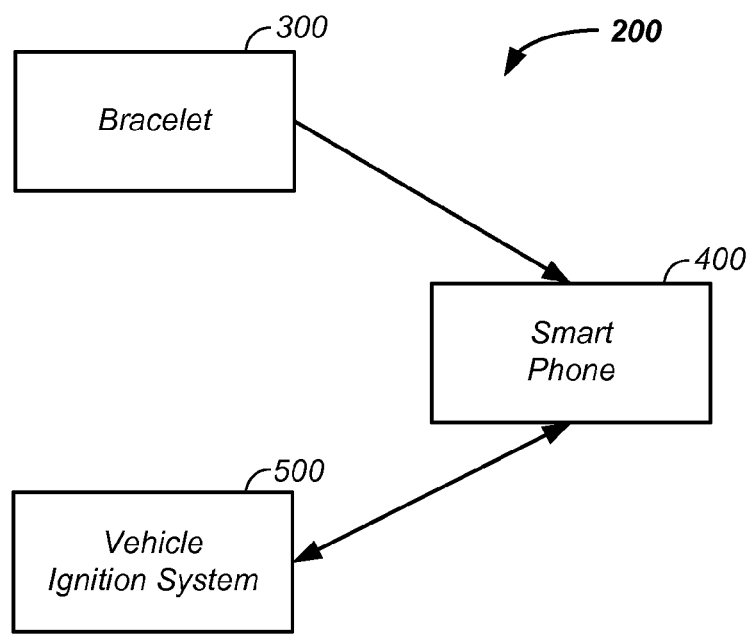
FIG. 2 illustrates bracelet/smartphone/ignition system communication.

Referring now to FIG. 2, a bracelet/ignition communication system 200 is illustrated, which is an example of the identification/peripheral device system 100. In this example, a bracelet 300 is worn by an individual 312. The bracelet 300 identifies the individual and warrants the presence of the particular individual, as described infra. Further, the bracelet 300 is in direct and/or indirect communication with a vehicle ignition system 500. For example, the communication between the bracelet 300 and vehicle ignition system 500 uses any of the communication apparatus described, supra, for the identification/peripheral device system 100. In a non-limiting/specific example, the bracelet 300 is used to identify the particular individual and to confirm presence of the individual to a smartphone 400, where the confirmation takes optionally takes the form of a digital certificate. Optionally, the digital certificate is write protected, encrypted, or otherwise secured. The smartphone is used to relay presence of the individual to a vehicle computer linked to the vehicle ignition system 500 or directly to the vehicle ignition system 500, again optionally with the use of another digital certificate. Similarly, the vehicle ignition system 500 optionally forms yet another digital certificate. Each of the bracelet 300, smartphone 400, and vehicle ignition system 500 are further described, infra. The individual and optionally combined digital certificates are further described infra.

Bracelet

Figure 3:
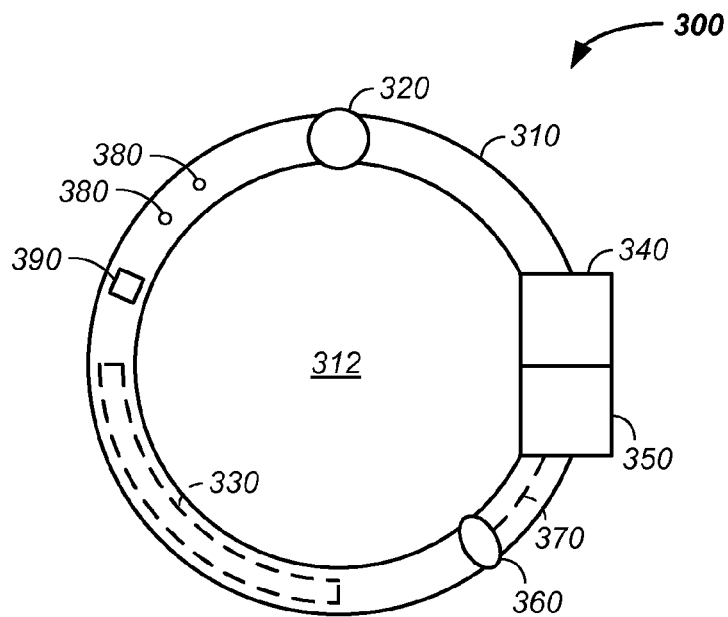
FIG. 3 illustrates a bracelet.

Referring now to FIG. 3, the bracelet 300 is illustrated. Generally, the bracelet is worn by a specific individual and is used to identify the presence of the specific individual associated with the bracelet. The bracelet 300 is optionally circular, annular, or is of a geometry that forms an outer perimeter about a body part, as described herein.

The bracelet 300 is removable, is removable only with destructive force, or is removable with use of a form of a key. In the first case, the bracelet is removable and is used to identify proximity of an individual 312. The presence of the individual 312 is used to facilitate an action. For example, as the individual 312 is walking up to the individual's vehicle, the bracelet communicates the presence of the individual 312 to the vehicle and the vehicle is automatically unlocked and/ or started based on the presence of the individual. In the second case, the bracelet is not readily removable, but the bracelet is still used to identify presence of the individual 312 to the communication device 120 and/or peripheral device 130. The not readily removed bracelet includes one or more of: a security ring 310 or loop, a security mechanism 320, a wireless communication device 330, a power supply 340, a communication system 350, a motion charged power supply 360, an internal wire 370, wire bundle or fiber optic, an indicator light 380, and a motion sensor 390.

The security ring 310, security band, annular device, loop, or structure circumferentially surrounds a body part of the individual during use in a manner where, along a given plane crossing axially through the individual's body part, an inner perimeter distance or diameter of the security ring is smaller than an outer perimeter distance or outer diameter of an extension of the body part along a longitudinal axis perpendicular to the axial axis on both a first longitudinal side of the bracelet 300 and on a second longitudinal side of the bracelet. The security ring 310 is preferably formed of a rigid material, such as steel, stainless steel, a hardened material, or material difficult to cut, remove, or alter.

The optional security mechanism 320, such as a lock, crimp, or seal, is used to affix the security ring 310 about the body part of the individual 312 in a manner that is not readily removable without breaking or altering of the security mechanism 320. The seal on the security mechanism 320 optionally forms a two or three dimensional mark using a softer material than the security ring 310, where the unaltered mark represents a non-tampered seal and/or an authority symbol, such as from a police or legal system. For example, the security ring 310 is crimped at the security mechanism 320 to form a continuous loop about the body part of the individual 312. Optionally, the crimping mechanism is engraved so as to form the mark on the bracelet 300 when the crimping of the bracelet 300 is performed.

The wireless communication device 330 is optionally a radio-frequency identification (RFID) system or tag. The radio-frequency identification tag is optionally powered by a battery electrically connected to the radio-frequency identification tag or is powered by an electromagnetic field used to read the radio-frequency identification tag.

The optional power supply 340, such as a battery, is optionally embedded within the bracelet 300, is semi-embedded into the bracelet 300, is attached to the bracelet 300, or is replaceable affixed to the bracelet 300.

The optional communication system 350 is any device used to digitally identify the presence of the bracelet 300 and hence the specific individual to an outside digital system, where the communication system 350 is not the radio-frequency identification tag.

The optional motion charged power supply 360 is used to charge an electrically coupled power consuming device in the bracelet 300, such as the wireless communication device 330, the power supply 340, the communication system 350, and/or a mechanical winding mechanism. Additionally and/or optionally, the motion powered power supply 360 is used to run a current or a voltage through the internal wire, where cutting the internal wire 370 or fiber optic results in an electrical short causing the bracelet 300 to refuse to identify the presence of the individual 312 to the peripheral device and/or to contact an authority person or authority system.

The optional indicator(s) 380, which are electrically and logically connected to a power supply and logic unit, are used to inform the individual 312 that the bracelet 300 is any of: on, off, transmitting, receiving, within range of a vehicle, within an acceptable boundary, outside an acceptable boundary, inside a court ordered boundary, outside of a court ordered boundary, in communication with an authority system, in range of an authority system, out of range of an authority system, functioning, and/or malfunctioning.

The optional motion sensor 390, detects motion along the x-, y-, and/or z-axes. The motion sensor 390 uses the detected motion to determine shake of the individual 312. Shake of the individual is optionally used to determine alcohol impairment of the individual 312, marijuana impairment of the individual, drug impairment of the individual, THC and/or marijuana impairment of the individual, an epileptic seizure of the patient 312, and/or to indicate that the patient 312 was just in an accident. The use of shake of the individual 312 is an example of a secondary test or auxiliary test of impairment. Optionally, the motion sensor 390 is placed into the smartphone 400, which is described infra.

Smartphone

As described, supra, the identification device 110 or bracelet 300 is optionally in communication with a communication device 120, such as a smartphone 400.

Figure 4:
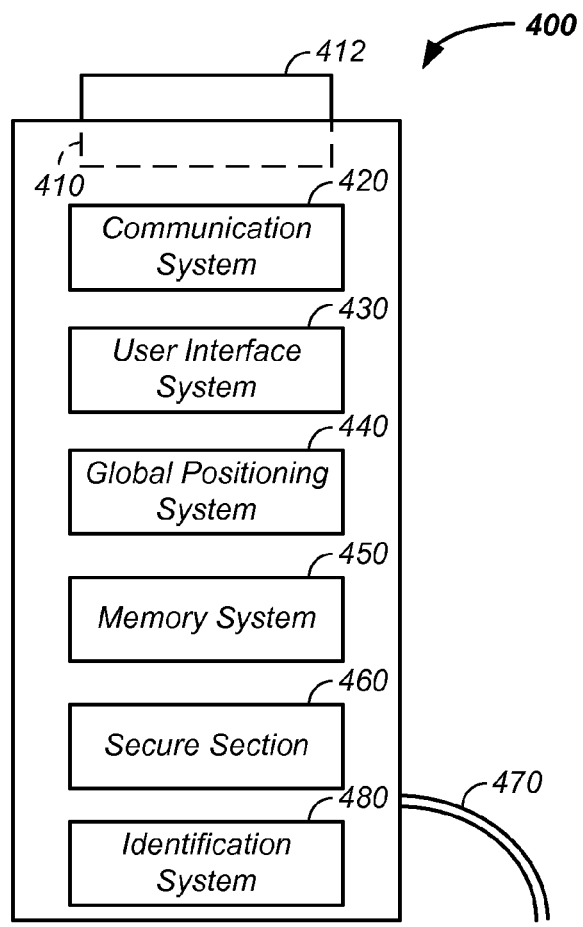
FIG. 4 illustrates a smartphone.

Referring now to FIG. 4, the smartphone 400, which herein also refers to a feature phone, a mobile phone, a portable phone, and/or a cell phone is further illustrated. The smartphone 400 contains a number of hardware and software features, which are optionally usable in combination with the bracelet 300, such as a hardware port 410, a communication system 420, a user interface system 430, a global positioning system 440, a memory system 450, a secure section 460, an identification system 480, and/or a power inlet 470 or power supply.

The hardware port 410 of the smartphone 400 typically contains one or more electro-mechanical connectors designed to physically link to an external hardware element. Examples of connectors include a power supply port, a universal serial bus (USB) port, an audio port, a video port, a data port, a port for a memory card, and a multi-pin connector, such as a 30-pin connector.

In one embodiment, one or more of the hardware ports 410 interface to a bracelet receiver 412. The bracelet receiver 412 optionally wirelessly interfaces the bracelet 300 to the smart phone 400. For example, the bracelet receiver 412 receives input from the bracelet 300 or wireless communication device 330 of the bracelet. In a particular example, the wireless communication device 330 is the RFID tag, which transmits signal over a limited distance, such as in the centimeters to many meters range. Generally, the distance of communication is a function of frequency, with lower frequencies of communication being in the kiloHertz range that transmit for centimeters and the higher frequency gigaHertz range transmitting for hundreds of meters. Herein, for use of confirming that the individual 312 is proximate the smartphone 400, the preferred frequency of the wireless communication is in the 5 to 7000 megaHertz range, which transmits the signal from 1 to 100 meters or a lower frequency range transmitting from 10 to 100 centimeters. Preferably, the transmission range of the RFID tag is in the range of less than 5, 10, 15, 20, 25, 30, 40, 50, 75 or 100 centimeters.

The bracelet receiver 412 is optionally produced for law enforcement. As such, the bracelet receiver 412 optionally contains a number of features associated with tracking the individual 312, such as recognition of being removed and replaced from the smartphone 400, secure programming or code, and/or a law enforcement programmable chip.

Each of the communication system 420, user interface system 430, global positioning system 440, and/or memory 450 of the smartphone 400 is optionally used as part of the identification/peripheral device system 100. In a first example, the individual 312 uses the smartphone 400 to call an authority system to report the individual's 312 location, using the communication system 420, user interface system 430, and global positioning system 440, where the smartphone 400 is used to confirm identity of the individual 312 through the smartphone 400/bracelet 300 localized communication system. In a second example, the smartphone 400 notes position of the individual 312 as a function of time and records the position information in the memory 450 or transmits the location in real or delayed time to an authority system. In a third example, the cell phone automatically communicates position of the individual 312 to an authority system without interaction of the individual 312.

The secure section 460 of the smartphone 400 is used to impede tampering by the individual, such as impedance of reprogramming any element of the identification/peripheral device 100.

The optional identification system 480 of the smartphone 400 is used as a primary identification of the individual or preferably as a secondary identification of the individual 312, where the bracelet 300 is the primary identification of the individual 312. Examples of use of the smartphone 400 for identification of the individual 312 include use of video or the individual 312, a photo of the individual 312, a scan of the iris of the individual 312, use of a fingerprint of the individual 312, and/or use of voice recognition of the individual 312 at time of identification along with reference data and a comparison algorithm. Generally any means of identification using the smartphone 400 is optionally used.

The power supply connected to the smartphone 400 is optionally indirectly used to provide power to a passive radio-frequency identification tag embedded in the bracelet 300, where the passive RFID lacks an integrated power supply.

Optionally, any of the features performed using the bracelet receiver 412 are optionally performed using a smartphone 400 application and/or standard feature in combination with internal hardware of the smartphone 400, such as a wireless receiver.

Optionally, one or more features of the smartphone 400 is embedded into the bracelet 300.

Herein, for clarity of presentation the smartphone 300 is used to describe the communication device 120. However, the communication device is optionally any of: a device integrated with a phone, an SD card, a memory card, a tablet computer, and/or any digital communication device.

Vehicle Ignition System

Herein, the vehicle ignition system 500 includes any element of a vehicle 510 used to start the vehicle 510. Herein, the vehicle 510 comprises any system used to transport the individual 312 under the control of the individual 312, such as a car, truck, motorcycle, motor powered transporter, engine powered transporter, hybrid vehicle, boat, airplane, or the like.

Figure 5:
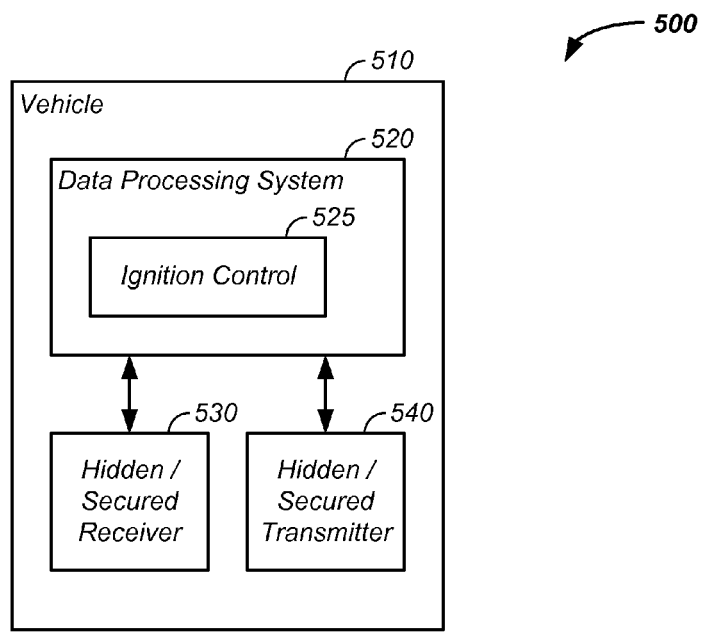
FIG. 5 illustrates data transfer within a vehicle.

Referring now to FIG. 5, the vehicle ignition system 500 is illustrated. The vehicle 510 is optionally configured with one or more of: a data processing system 520, an ignition control 525, a hidden/secured receiver 530, and/or a hidden/secured transmitter 540. For example, the hidden/secured receiver 530 receives a signal from the bracelet 300, which indicates proximity of the individual 312 wearing the bracelet 300. The signal is electronically, wirelessly, and/or digitally communicated to the data processing system 520, which is optionally a computer in the vehicle 510 as originally produced by the vehicle's manufacturer. The signal, originating from the bracelet 300, is used in a process of starting the vehicle 510. For instance, the RFID tag indicates that the individual's bracelet is less than 10, 20, 30, 40, 50, 75, 100, 150, or 200 centimeters from a breathalyzer. For instance, the RFID tag of the bracelet is designed with a low frequency transmitter requiring the individual's hand to be within 20 centimeters of the breathalyzer hardware, which optionally contains a receiver to identify the bracelet. This low distance signal transmitter hinders starting of the vehicle using breathalyzer data collected from a second person, such as a non-drinking friend. In this example, the starting of the vehicle or result of the breathalyzer is optionally reported back to the smartphone 400 using the hidden/secured transmitter 540.

Generally, the bracelet 300 is used in combination with any known breathalyzer hardware and/or software and/or with any known analysis of a biomedical sample obtained from the individual, such: as a blood/serum sample; a sample obtained by scraping or swabbing; and/or a sample obtained through the skin, such as via iontophoresis. Further, the drug analysis is optionally performed noninvasively, such as with light, infrared light, near-infrared light, and/or with any form of spectroscopy.

External Monitoring

Figure 6:
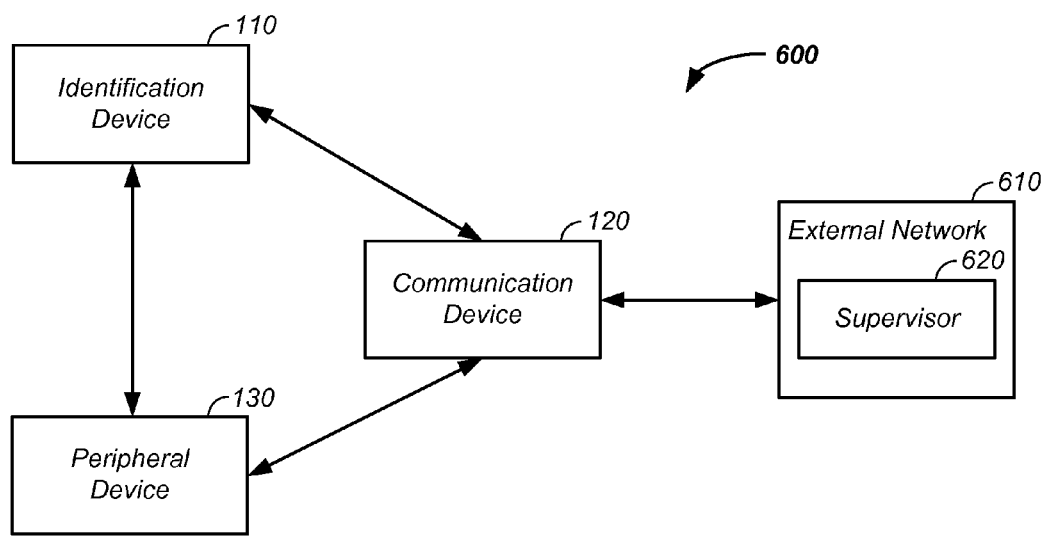
FIG. 6 illustrates the personal identification system communicating with an external network.

Referring now to FIG. 6, an authority system 600 is illustrated. Optionally, the identification/peripheral device system 100 communications with an external network 610, such as a law enforcement network, and through the network to a supervisor 620. The authority system 600 is used for any of:
- spot checking position of the individual 312;
- receive notification of the individual 312 entering and/or departing an approved and/or restricted zone, such as:
  - a route to an approved destination, such as a workplace, a grocery store, and/or a gas station;
  - a legally geographically fenced zone;
  - an approved distance from a location, such as a radius of travel from a home;
  - departure from a property, such as in a home arrest;
  - entry into a restricted destination, such as a playground, school, or bar; and/or
  - departure from a county or state;
- monitoring communication status of the communication device 120; and
- global position tracking of the individual.

The external network 610 or law enforcement network is optionally used to transmit data to a law enforcement officer.

Data Authenticity

Optionally, data gathered by any element of the identification/peripheral device system 100 is recorded, verified, transmitted, and/or securely transmitted in a manner verifying authenticity, such as through use of a digital certificate, an electronic handshake, or through use of a checksum. For example, in the case of the bracelet 300/vehicle ignition system 500 combination, the data authenticity indicates that the specific individual 312 associated with the bracelet 300 is present and that the information transmitted is secure, such as for use in a legal proceeding. The digital certificate(s) and a digital certificate system 700 are described herein.

Figure 7:
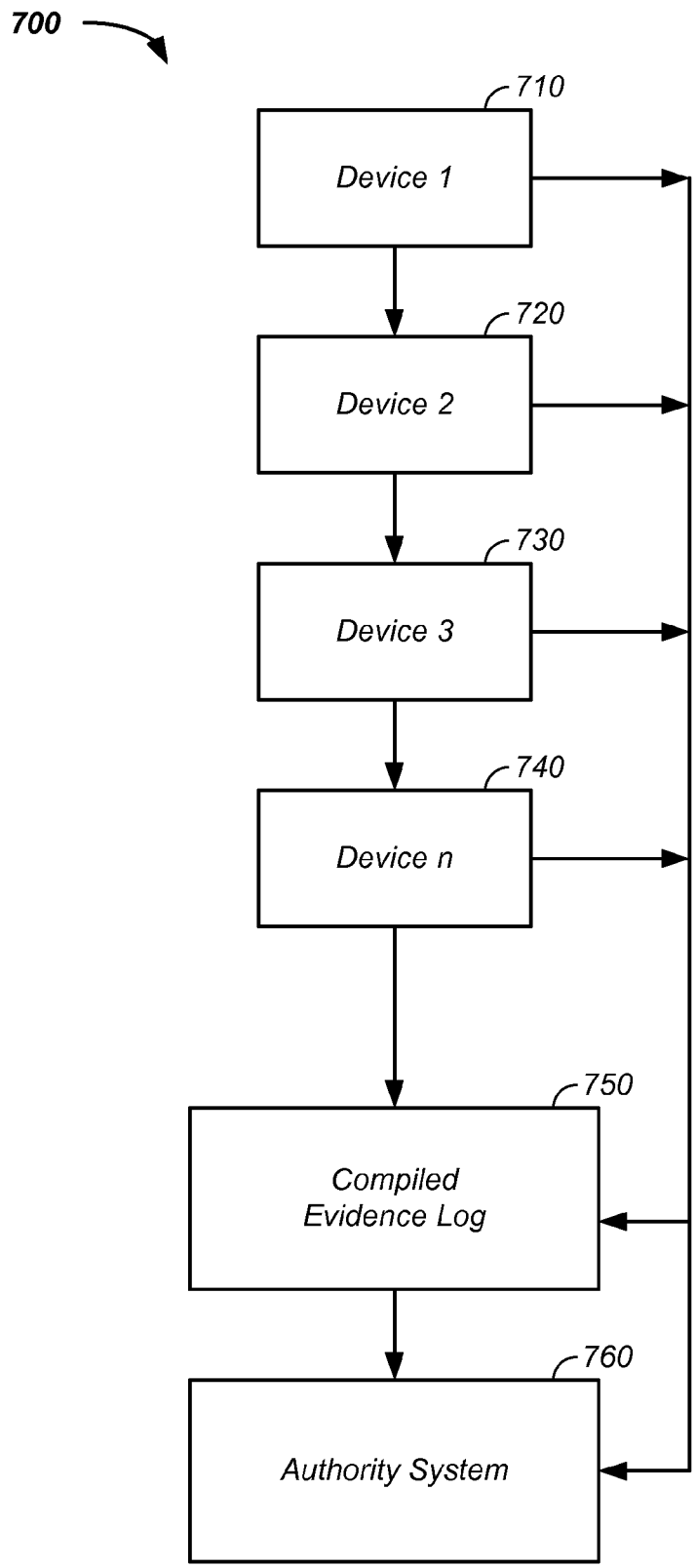
FIG. 7 illustrates a certification system.

Referring now to FIG. 7, a digital certificate system 700 is illustrated. Generally, one or more devices produce one or more digital certificates. As illustrated, a first device 710 generates a first digital certificate, which is communicated to a second device 720, to a compiled evidence log 750, and/or to an authority system 760, which is an example of the external network 610. The second device 720 optionally generates a second digital certificate and/or securely amends the first digital certificate. Similarly, a third device 730 optionally generates a third digital certificate and/or securely amends the first or second digital certificate. The process of producing and/or amending digital certificates is optionally repeated n times, such as with an $n^{th}$ device 740, where n is a positive integer. Hereinafter, the generated and/or amended digital certificates are referred to as a certificate. Preferably, each of the devices 710, 720, 730, 740 records information in the corresponding certificate that the device can confirm. Generally, the compiled evidence log 750 is a concatenation, combination, and/or summary of the underlying certificates, where information in the compiled evidence log 750 represents a secure chain of evidence. The compiled evidence log 750 is optionally used by an authority system, such as in a legal proceeding.

Figure 8:
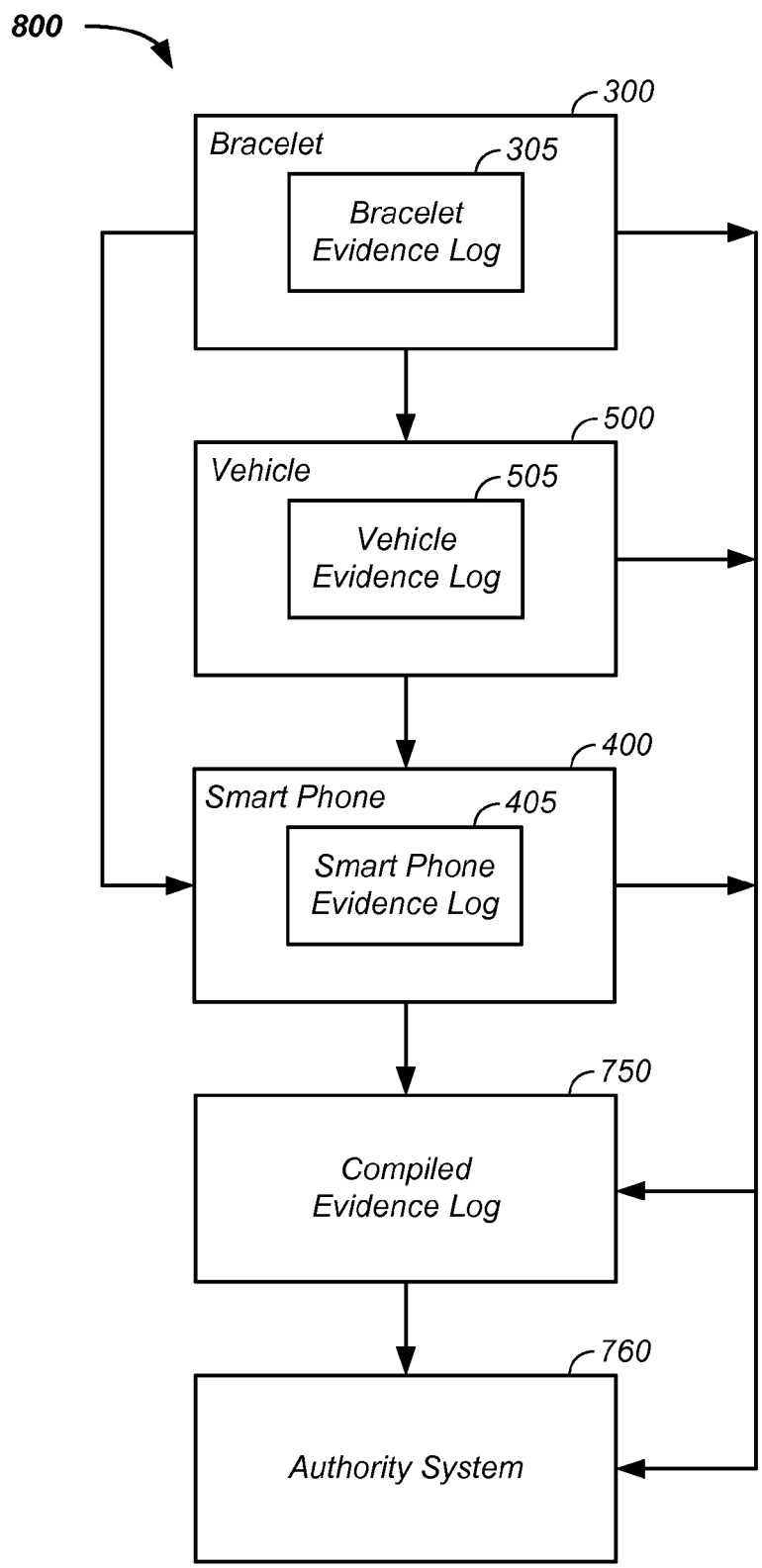
FIG. 8 illustrates a vehicle interlock certification system.

Referring now to FIG. 8, an example of a bracelet/vehicle digital certificate system 800 is illustrated, which corresponds to the identification/peripheral device system 100. In the bracelet/vehicle digital certificate system 800, the bracelet 300, the smart phone 400, and the vehicle 500 are examples of the first device 710, the second device 720, and the third device 730 of the digital certificate system 700, described supra.

Still referring to FIG. 8, the bracelet 300 produces a bracelet evidence log 305 corresponding to the generic first digital certificate. Examples of information securely recorded into the bracelet evidence log 305 include:
- specific identity of an individual wearing the bracelet;
- a time stamp of installation of the bracelet about the individual;
- a time stamp of breaking of a bracelet security seal;
- communications with an auxiliary device;
- time stamps of any of the communications with the auxiliary device;
- a record of any modified data yielding a secure dataset;
- time(s) of proximity to the smart phone 400, such as a start time and stop time; and/or
- time(s) of proximity to the vehicle 500, such as a vehicle start time and a vehicle off time.

Still referring to FIG. 8, the smart phone 400 produces a smart phone evidence log 405 corresponding to the generic second digital certificate. Examples of information securely recorded into the smart phone evidence log 405 include:
- times of power interruption;
- if data in the phone was altered;
- a time stamp of breaking of a phone security seal;
- communications with an auxiliary device;
- time stamps of any of the communications with the auxiliary device;
- a record of any modified data yielding a secure dataset;
- time(s) of proximity to the bracelet 300, such as a start time and stop time; and/or
- time(s) of proximity to the vehicle 500, such as the vehicle start time and the vehicle off time.

Still referring to FIG. 8, the vehicle 500 produces a vehicle evidence log 505 corresponding to the generic third digital certificate. Examples of information securely recorded into the vehicle evidence log 405 include:
- vehicle start time(s);
- drive time(s);
- vehicle off time(s);
- proximity to bracelet time(s);
- vehicle positions as function of time;
- verification of true and accurate data;
- recordations of any data changes;
- times of power interruption;
- if data in the vehicle evidence log 405 was altered;
- a time stamp of breaking of a vehicle security seal;
- communications with an auxiliary device;
- time stamps of any of the communications with the auxiliary device;
- a record of any modified data yielding a secure dataset;
- time(s) of proximity to the bracelet 300, such as a start time and stop time; and/or
- time(s) of proximity to the smart phone 400.

A specific example illustrates use of the bracelet 300/bracelet log 305, smart phone 400/smart phone log 405, and vehicle 500/vehicle log 505. The bracelet 300 identifies an individual in the bracelet log 305 and provides the information to the vehicle 500. The vehicle 500 records the identity of the person in the vehicle log 505 along with vehicle ignition times, off times, drive times, and/or position of the vehicle 500. The vehicle log 505 and/or bracelet log 305 are securely transmitted to the smart phone 400/smart phone log 405 and the smart phone securely relays the combined log information to the external network 610, supervisor 620, compiled evidence log 750, and/or authority system 760. Generally, the information transmitted represents a secure chain of true and accurate data from the bracelet 300 and vehicle 500 to an end system.

Generally, any of the data recorded in any of the logs is verifiable in terms of time with a time stamp, information in terms of a sensor, data in terms of internal restricted access computer code, and data changes in terms of name of the personnel, and/or via use of a history log in a manner admissible under the Federal Rules of Evidence.

In another embodiment, a retrofit device is used to implement recognition of the bracelet to a car not equipped with bracelet recognition software.

In another embodiment, the bracelet 300 is used to identify the individual 312 for any other purpose, such as to control an auxiliary device, such as an electronic piece of equipment, a stereo element, or volume of a stereo. Similarly, the bracelet 300 is optionally used to identify the individual 312 to a device where the device uses the identification of the individual to set one or more control parameters. Examples of control parameters include: (1) a speed limit control and/or (2) a regulator control or limit. Still further, the identification of the individual 312 via the bracelet 300 is optionally by an auxiliary electronic device to requirement an action, such as use of a seatbelt.

Personal Monitor

The personal identification/peripheral device system 100 described, supra, is described as identifying the individual 312 to a peripheral device 130. In another embodiment, the identification device 110 is used as a part of a process of relaying personal data to the external network 600. For example, a sensor is used to read a body parameter of the individual 312 using a peripheral device 130, such as a wearable personal device, and to relay the data directly and/or through the communication device 120 to an external network 610.

Figure 9:
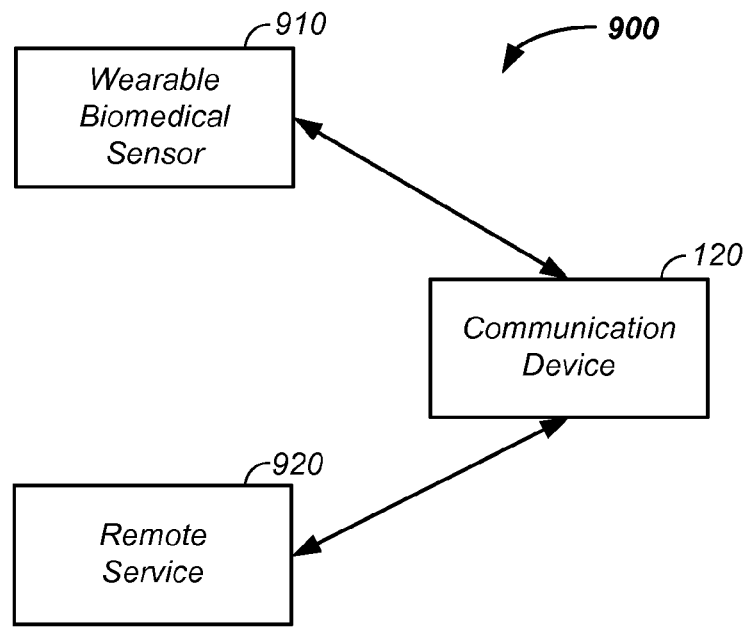
FIG. 9 illustrates a personal health monitoring system.

Referring now to FIG. 9, a personal health monitoring system 900 is illustrated. In the personal health monitoring system 900, the individual 312 carries or wears a biomedical sensor 910 and data from the biomedical sensor 910 is sent through the communication device 120 to a remote service 920. Herein, the wearable biomedical sensor 910 is optionally the peripheral device 130 functioning with the identification device 110, described supra, or is integrated into a personal health bracelet, where the personal health bracelet contains any of the hardware, features, and/or functionality of the identification device 110, peripheral device 130, or bracelet 300, described supra.

Figure 10:
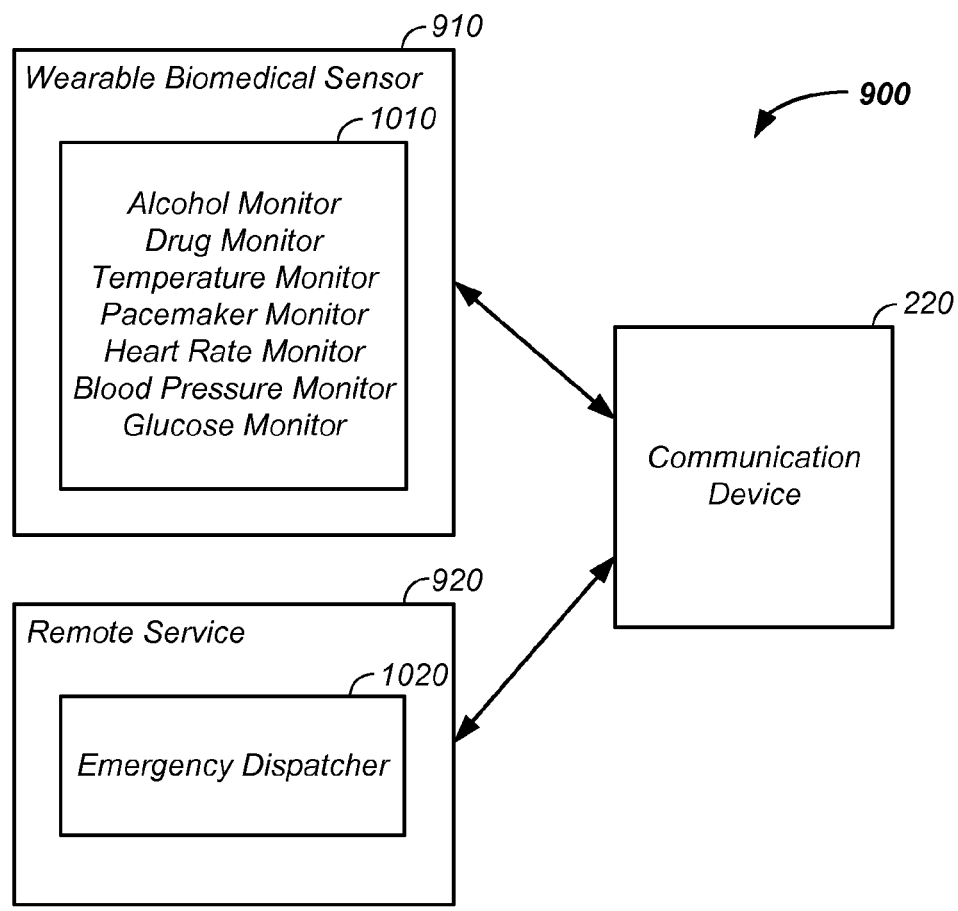
FIG. 10 provides examples of a wearable personal health monitoring system.

Referring now to FIG. 10, examples of the personal health monitoring system 900 are illustrated. As illustrated, the wearable biomedical sensor 910 includes any of: an alcohol monitor; a marijuana monitor, such as a direct marijuana monitor and/or an indirect marijuana monitor, where the indirect marijuana monitor analyzes a marijuana metabolite and/or a formed marijuana derivative, such as achieved through a chemical reaction with a provided reactant in a drug test; a drug monitor; a temperature monitor; a pacemaker monitor; a heart rate monitor; a blood pressure monitor; an electrode affixed to a body part, a force meter, a temperature probe, a pH reader, a hydration monitor, or a biomedical sensor element 1010. For example, the wearable biomedical sensor 910 monitors a pacemaker and in the event of an abnormality relays the abnormality and location of the individual through the communication device 120 to the remote service 920, such as to a dispatcher 1020, for medical service and/or to a medical professional.

Drug/Vehicle Ignition Lock

In one embodiment, the biomedical sensor element senses a form of marijuana and outputs a result to the peripheral device 130 and/or to the vehicle ignition system 500, where the result is used in determination as to whether the vehicle ignition system should be rendered functional or locked, such as through an interlock system. The result of the biomedical sensor is optionally used with or without use of the personal identification system in determination as to whether to grant access to the vehicle ignition system.

The marijuana test optionally tests for any form of tetrahydrocannabinol (THC), THC, any impairing element of marijuana, one or more metabolites of THC, a derivative form of THC, and/or any component of marijuana reacted with a reagent in a drug test. Tetrahydrocannabinol, THC, or its main isomer $(-)$-trans-$\Delta^9$-tetrahydrocannabinol ((6aR,10aR)-delta-9-tetrahydrocannabinol), is the principal psychoactive constituent or cannabinoid of the *cannabis* plant. Sampling the individual optionally uses an invasive or noninvasive test. Examples of an invasive test include, but are not limited to: use of a blood and/or serum sample drawn in any fashion, such as via a syringe; use of a swab, swatch, or scape to gather a sample; and/or use of any biological fluid drawn from or through skin, through the epidermis, and/or from an interstitial space of the individual, such as through iontophoresis. The collected sample is optionally concentrated, such as via use of a solid phase extraction material; combined and/or reacted with a chemical reagent; and/or is separated. The sample is optionally tested with any known means and/or any analytical instrumentation, such as via spectroscopy and/or chromatography. Preferably, the sample is extracted; concentrated, reacted, and/or separated; and analyzed. Examples of a noninvasive test include any analysis of the individual using light, such as ultraviolet, visible, infrared, and/or near-infrared light in combination with any form of chemometrics.

The marijuana test optionally tests for: recent marijuana use, such as in the previous 1, 2, 3, 4, 5, 8, 12, or 24 hours; impairment resulting from recent marijuana use, such as by comparing the determined drug level against a metric, standard, and/or concentration; and/or a marijuana related metric, such as a concentration metric, relative to a legal level of the marijuana metric.

Herein, marijuana is used as an example of a drug tested. More generally, the biomedical sensor element 1010 is used to monitor and/or test any prescription drug or any illegal substance. In one case, the drug tested is tested with any non-alcohol drug test. Stated again, the drug test is not a blood alcohol or alcohol breathalyzer test.

In yet another embodiment, a personal identification device, such as the bracelet or an embedded microchip used to identify the person is in communication with an auxiliary device and a remote system.

Herein, a set of fixed numbers, such as 1, 2, 3, 4, 5, 10, or 20 optionally means at least any number in the set of fixed number and/or less than any number in the set of fixed numbers.

Still yet another embodiment includes any combination and/or permutation of any of the elements of any of the embodiments described herein.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for controlling an ignition system used by a particular individual, comprising the steps of:
    the particular individual wearing an identification bracelet;
    said identification bracelet identifying the particular individual;
    said identification bracelet communicating presence of the particular individual to a localized peripheral system, said localized peripheral system within ten meters of said identification bracelet during said step of communicating;
    performing a non-alcohol drug test on the particular individual;
    communicating results of said non-alcohol drug test with said localized peripheral system; and
    said localized peripheral system controlling an ignition interlock of said ignition system using both: the communicated presence of the particular individual and the results of said non-alcohol drug test.

2. The method of claim 1, further comprising the step of:
    semi-permanently affixing the identification bracelet circumferentially about a body part of the particular individual to form a security bracelet, wherein said security bracelet comprises of a band of at least one rigid and stiff material circumferentially surrounding the body part of the particular individual, wherein at least one of destructive force and a key is required to remove the bracelet.

3. The method of claim 2, wherein an inner perimeter of said security bracelet, on a plane crossing axially through the body part of the particular individual, is smaller than an outer perimeter of an extension of the body part along a longitudinal axis perpendicular to the axial axis on both: (1) a first longitudinal side of said identification bracelet and (2) on a second longitudinal side of said identification bracelet.

4. The method of claim 3, further comprising the step of:
    communication from said identification bracelet warranting, in a manner admissible under the Federal Rules of Evidence, both (1) identification of the individual and (2) presence of the individual.

5. The method of claim 4, said step of warranting providing further comprising the step of:
    communicating a secure transactional stamp to at least one of:
        a controller of a vehicle ignition system;
        a police authority;
        a police authority system;
        a supervisor;
        a parole officer; and
        a law enforcement network.

6. The method of claim 2, said step of semi-permanently affixing said security bracelet further comprising:
    using a security mechanism, of said identification bracelet, to join a first section of a complete loop about the body part to a second section of said complete loop about the body part, said security mechanism comprising at least one of:
        a lock;
        a crimp; and
        an authority seal.

7. The method of claim 1, said step of performing a non-alcohol drug test further comprising any of the steps of:
    testing for tetrahydrocannabinol;
    testing for $(-)$-trans-$\Delta^9$-tetrahydrocannabinol;
    testing for a psychoactive constituent of cannabis;
    testing for a metabolic derivative of tetrahydrocannabinol;
    testing for marijuana use; and
    testing for marijuana impairment.

8. The method of claim 7, said identification bracelet comprising at least one of:
    a communication system at least partially embedded in said identification bracelet;
    a radio-frequency tag at least partially embedded in said identification bracelet;
    an external power supply affixed to said identification bracelet;
    an internal power supply at least partially embedded into said identification bracelet;
    a motion charged power supply at least partially embedded into said identification bracelet;
    at least one wire embedded into said identification bracelet;
    at least one fiber optic embedded into said identification bracelet;
    an optical indicator on an outer surface of said identification bracelet; and
    a motion sensor coupled to said identification bracelet.

9. The method of claim 8, said communication system comprising a link to at least one of:
    a wireless internet connection;
    a business;
    a form of a phone; and
    a smart phone.

10. The method of claim 8, further comprising the step of:
said radio-frequency tag at least partially embedded in said identification bracelet communicating with a controller of a vehicle ignition system.

11. The method of claim 10, further comprising the step of:
said identification bracelet warranting localized presence of the particular individual to said controller of said vehicle ignition system using said radio-frequency tag, said radio-frequency tag communicating using at least one frequency in the range of one kilo-hertz to one giga-hertz.

12. The method of claim 8, further comprising the step of:
reporting evidence of tampering of said identification bracelet to an authority system upon detection of the electrical short.

13. The method of claim 7, further comprising the steps of:
coupling said identification bracelet with a communication system of said localized peripheral system, said communication system comprising at least one of:
 a data transfer system of a form of a phone;
 a data transfer system of a smart phone; and
 a wireless internet connection; and
using said communication system of the localized peripheral system to communicate with a localized vehicle ignition system, said localized peripheral system within one meter of the particular individual, said localized peripheral system within ten meters of the vehicle ignition system.

14. The method of claim 7, further comprising the steps of:
coupling said identification bracelet with a communication system of said localized peripheral system, said communication system comprising at least one of:
 a vehicle communication system;
 a data transfer system of a phone;
 a digital data transfer system of a cell phone;
 a data transfer system of a smart phone; and
 a wireless internet connection; and
using said communication system of said localized peripheral system to communicate with a remote system.

15. The method of claim 14, said communication system used to report a current position of the particular individual.

16. The method of claim 14, said communication system used to report presence of the particular individual in at least one of:
 a position outside of a court ordered boundary;
 a position in a restricted geographical zone;
 a position outside of a legal, geographically fenced, zone;
 a position off of property of the particular individual; and
 a position within a boundary of at least one of:
  a playground;
  a school; and
  a bar.

17. The method of claim 1, further comprising the step of:
said identification bracelet securely transmitting a digital certificate warranting: (1) identification of the particular individual and (2) presence of the particular individual.

18. The method of claim 1, said step of communicating comprising an automated system not requiring interaction of the particular individual.

19. An apparatus for controlling an ignition system used by a particular individual, comprising:
 an identification bracelet associated with the particular individual, said identification bracelet configured to be worn by the particular individual;
 said identification bracelet comprising embedded means for communicating presence of the particular individual to a localized peripheral system, said localized peripheral system within ten meters of the particular individual during use;
 said localized peripheral system comprising means for receiving a result of a non-alcohol drug test; and
 said localized peripheral system configured to control an ignition interlock of said ignition system using both: the communicated presence of the particular individual and the result of the non-alcohol drug test.

20. The apparatus of claim 19, wherein said means for communicating comprises at least one of:
 a wireless broadcast system;
 a wireless confirmation system;
 an optical signal generator; and
 a radio-frequency identification tag.

* * * * *